United States Patent
Liang et al.

(10) Patent No.: US 12,393,348 B2
(45) Date of Patent: Aug. 19, 2025

(54) METHOD, ELECTRONIC DEVICE, AND PROGRAM PRODUCT FOR DISK MAPPING

(71) Applicant: Dell Products L.P., Round Rock, TX (US)

(72) Inventors: Shuangshuang Liang, Zunyi (CN); Yang Zhang, Chengdu (CN); Chaojun Zhao, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/586,999

(22) Filed: Feb. 26, 2024

(65) Prior Publication Data

US 2025/0053306 A1  Feb. 13, 2025

(30) Foreign Application Priority Data

Aug. 10, 2023 (CN) .......................... 202311008010.5

(51) Int. Cl.
G06F 3/06 (2006.01)

(52) U.S. Cl.
CPC .......... *G06F 3/0617* (2013.01); *G06F 3/0644* (2013.01); *G06F 3/0689* (2013.01)

(58) Field of Classification Search
None
See application file for complete search history.

(56) References Cited

U.S. PATENT DOCUMENTS

| | | |
|---|---|---|
| 8,799,705 B2 | 8/2014 | Hallak et al. |
| 9,367,395 B1 | 6/2016 | Bono et al. |
| 9,462,055 B1 | 10/2016 | Herrin et al. |
| 9,535,629 B1 | 1/2017 | Desimone et al. |
| 10,013,323 B1 | 7/2018 | Puhov et al. |
| 10,013,325 B1 | 7/2018 | Garrett, Jr. et al. |
| 10,114,772 B1 | 10/2018 | Steinmacher-Burow |
| 10,126,971 B1 | 11/2018 | Jain et al. |
| 10,241,712 B1 | 3/2019 | Elliott, IV et al. |
| 10,409,527 B1 | 9/2019 | Foley |
| 10,776,317 B1 | 9/2020 | Veeraswamy et al. |
| 10,860,245 B2 | 12/2020 | Zhao et al. |
| 10,936,464 B2 | 3/2021 | Vishwakarma et al. |
| 10,956,069 B2 | 3/2021 | Kushner et al. |
| 10,996,858 B2 | 5/2021 | Zhao et al. |
| 11,023,147 B2 | 6/2021 | Shang et al. |
| 11,023,315 B1 | 6/2021 | Jadon et al. |
| 11,036,602 B1 | 6/2021 | Tal |

(Continued)

*Primary Examiner* — Kaushikkumar M Patel
(74) *Attorney, Agent, or Firm* — BainwoodHuang

(57) ABSTRACT

Techniques for disk mapping involve dividing a plurality of disks into a plurality of groups based on the number and type of the plurality of disks. Such techniques further involve dividing the plurality of groups into a set of available groups and a set of unavailable groups based on the type of a target redundant array of independent disks (RAID), wherein an available group represents that disk units in the available group are able to form the target RAID, and an unavailable group represents that disk units in the unavailable group are unable to form the target RAID. Such techniques further involve enabling, by mapping one or more disk units in one or more available groups of the set of available groups into the set of unavailable groups, one or more unavailable groups of the set of unavailable groups to form the target RAID.

20 Claims, 7 Drawing Sheets

(56) References Cited

U.S. PATENT DOCUMENTS

| | | |
|---|---|---|
| 11,042,324 B2 | 6/2021 | Shveidel et al. |
| 11,048,643 B1 | 6/2021 | Lercari et al. |
| 11,061,770 B1 | 7/2021 | Patel et al. |
| 11,163,464 B1 * | 11/2021 | Gao ................. G06F 3/0631 |
| 11,231,859 B2 | 1/2022 | Han et al. |
| 11,947,803 B2 | 4/2024 | Cummins et al. |
| 2009/0210464 A1 | 8/2009 | Chiang-Lin |
| 2011/0138148 A1 | 6/2011 | Friedman et al. |
| 2015/0160885 A1 | 6/2015 | Hara et al. |
| 2016/0179386 A1 | 6/2016 | Zhang |
| 2018/0107383 A1 | 4/2018 | Galbraith et al. |
| 2018/0260154 A1 | 9/2018 | Dronamraju et al. |
| 2019/0042103 A1 | 2/2019 | Stabrawa et al. |
| 2019/0235781 A1 | 8/2019 | Gong et al. |
| 2020/0026445 A1 | 1/2020 | Wang et al. |
| 2020/0174686 A1 | 6/2020 | Song |
| 2020/0241762 A1 | 7/2020 | Gupta et al. |
| 2020/0341645 A1 | 10/2020 | Tang et al. |
| 2020/0401316 A1 | 12/2020 | Hankins et al. |
| 2021/0124506 A1 * | 4/2021 | Han ................. G06F 3/0608 |
| 2021/0132831 A1 * | 5/2021 | Zhuo ................ G06F 3/0631 |
| 2021/0216225 A1 | 7/2021 | Shang et al. |
| 2022/0129165 A1 * | 4/2022 | Cummins ............ G06F 3/0689 |
| 2022/0342757 A1 * | 10/2022 | Bao .................. G06F 11/1076 |

\* cited by examiner

METHOD, ELECTRONIC DEVICE, AND PROGRAM PRODUCT FOR DISK MAPPING

CROSS-REFERENCE TO RELATED APPLICATION

This application claims priority to Chinese Patent Application No. CN202311008010.5, on file at the China National Intellectual Property Administration (CNIPA), having a filing date of Aug. 10, 2023, and having "METHOD, ELECTRONIC DEVICE, AND PROGRAM PRODUCT FOR DISK MAPPING" as a title, the contents and teachings of which are herein incorporated by reference in their entirety.

TECHNICAL FIELD

Embodiments of the present disclosure relate to the field of computers, and more particularly, to a method, an electronic device, and a computer program product for disk mapping.

BACKGROUND

Redundant array of independent disks (RAID) is a technology for data storage that provides data redundancy, fault tolerance, and performance optimization by combining a plurality of independent hard disk drives together. RAID technology aims to address failures and performance bottlenecks that an individual hard disk drive may face. RAID technology is widely used in data centers and enterprise-level storage systems, to ensure data reliability and high efficiency.

Storage resources used by volumes or file systems may be allocated by an underlying mapped RAID technology called dynamic resilience engine (DRE). When calculating an available space, the DRE will consider the disk size and RAID type to determine the maximum available space for users.

SUMMARY OF THE INVENTION

Embodiments of the present disclosure relate to a method, an electronic device, and a computer program product for disk mapping.

According to a first aspect of the present disclosure, a method for disk mapping is provided. The method includes: dividing a plurality of disks into a plurality of groups based on the number and type of the plurality of disks; and dividing the plurality of groups into a set of available groups and a set of unavailable groups based on the type of a target redundant array of independent disks (RAID), wherein an available group represents that disk units in the available group are able to form the target RAID, and an unavailable group represents that disk units in the unavailable group are unable to form the target RAID. The method further includes: enabling, by mapping one or more disk units in one or more available groups of the set of available groups into the set of unavailable groups, one or more unavailable groups of the set of unavailable groups to form the target RAID.

According to a second aspect of the present disclosure, an electronic device for disk mapping is provided. The electronic device includes at least one processor; and a memory, the memory being coupled to the at least one processor and having instructions stored thereon, wherein the instructions, when executed by the at least one processor, cause the electronic device to perform actions, the actions including: dividing a plurality of disks into a plurality of groups based on the number and type of the plurality of disks; and dividing the plurality of groups into a set of available groups and a set of unavailable groups based on the type of a target redundant array of independent disks (RAID), wherein an available group represents that disk units in the available group are able to form the target RAID, and an unavailable group represents that disk units in the unavailable group are unable to form the target RAID. The actions further include: enabling, by mapping one or more disk units in one or more available groups of the set of available groups into the set of unavailable groups, one or more unavailable groups of the set of unavailable groups to form the target RAID.

According to a third aspect of the present disclosure, a computer program product is provided. The computer program product is tangibly stored on a non-volatile computer-readable medium and includes machine-executable instructions, wherein the machine-executable instructions, when executed, cause a machine to perform steps of the method implemented in the first aspect of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same elements.

DETAILED DESCRIPTION

Figure 1:
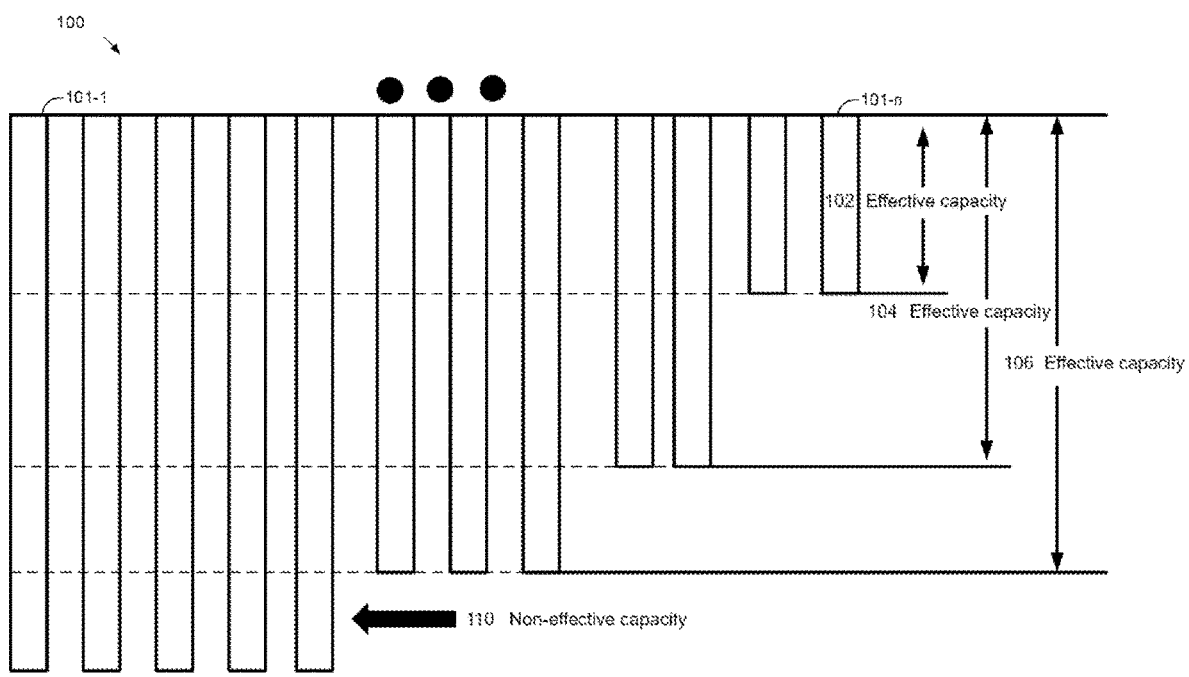
FIG. 1 illustrates a schematic diagram of an example in which a device and/or a method according to the embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The following will describe the embodiments of the present disclosure in more detail with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and the embodiments of the present disclosure are for illustrative purposes only, and are not intended to limit the protection scope of the present disclosure.

In the description of the embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In technical solutions for data storage, such as a RAID, unconsumed capacities usually exist, which are caused by the existence of large drives whose number is less than the minimum width requirement. Therefore, such calculation method has some drawbacks. For example, when a user chooses a RAID configuration that requires a large width but the number of large disks is less than the minimum width requirement, there will be more capacities not consumed. In addition, when there is a significant difference in size between large disks and small disks, a significant amount of space will be wasted. The unused space cannot be utilized by users, resulting in unnecessary expenses.

At least to address the above and other potential problems, an embodiment of the present disclosure provides a method for disk mapping. The method includes: dividing a plurality of disks into a plurality of groups based on the number and type of the plurality of disks; and dividing the plurality of groups into a set of available groups and a set of unavailable groups based on the type of a target redundant array of independent disks (RAID), wherein an available group represents that disk units in the available group are able to form the target RAID, and an unavailable group represents that disk units in the unavailable group are unable to form the target RAID. The method further includes: enabling, by mapping one or more disk units in one or more available groups of the set of available groups into the set of unavailable groups, one or more unavailable groups of the set of unavailable groups to form the target RAID. Portions of disks may be reassembled based on a current physical disk layout by using the method implemented in the present disclosure, thereby providing users with more opportunities to utilize non-effective capacity portions of disks and improving the utilization rate of disk resources.

The fundamental principles and several example embodiments of the present disclosure will be described in detail below with reference to the accompanying drawings. FIG. 1 illustrates a schematic diagram of a disk-based storage system 100 according to an embodiment of the present disclosure. It should be understood that the number and arrangement of assemblies, elements, and disks illustrated in FIG. 1 are examples only, and different numbers and different arrangements of assemblies, elements, and disks as well as various additional elements may be included in the schematic diagram. It should be understood that the above example is only used to illustrate the disk-based storage system 100. With the development of technology, the disk-based storage system 100 may include various known or unknown disks, mechanical hard disks, solid-state hard disks, hybrid hard disks, external hard disks, SAS hard disks, RAID storage arrays, optical disks, floppy disks, and the like that are applied in various fields and various aspects, and the present disclosure is not limited in this regard.

As shown in FIG. 1, the storage system 100, such as a RAID, is composed of a plurality of disks 101-1 to 101-n of different types and capacities. The disks 101-1 to 101-n may be logically divided into a plurality of disk spaces, such as disk spaces 102 to 110. In order to form a RAID, effective available capacities of the disk spaces that a user can use depend on the capacity that each drive/disk can consume, as well as the minimum width/number of disks required for the RAID configuration.

If the user uses disks of different sizes/capacities to create a pool, it may result in some unused disk spaces, such as the disk space 110 in a context where RAID 5 (4+1) is as an example. On the contrary, the disk spaces 102, 104, and 106 are effective capacities (ecap) that can be used to form the RAID 5. If the effective capacity portions 102 to 106 contain enough disks, even if some disks are deleted, the remaining disks will be maintained in such classification as long as the number of the remaining disks always exceeds the minimum number required to build a RAID. If the removed disks are added/mapped to a non-effective capacity (non-ecap) portion 110 and the requirements for forming a RAID are met, the non-effective capacity portion 110 will become an ecap portion available for users, thereby increasing available capacities.

As an example, the storage system 100, such as a RAID, may be installed in any computing device that has processing computing resources or storage resources. For example, the computing device can have common capabilities such as receiving and sending data requests, real-time data analysis, local data storage, and real-time network connectivity. The computing device may typically include various types of devices. Examples of the computing device may include, but are not limited to, database servers, rack-mounted servers, server clusters, blade servers, enterprise-level servers, application servers, desktop computers, laptops, smartphones, wearable devices, security devices, intelligent manufacturing devices, smart home devices, IoT devices, smart cars, drones, and the like, and the present disclosure is not limited in this regard.

Figure 2:
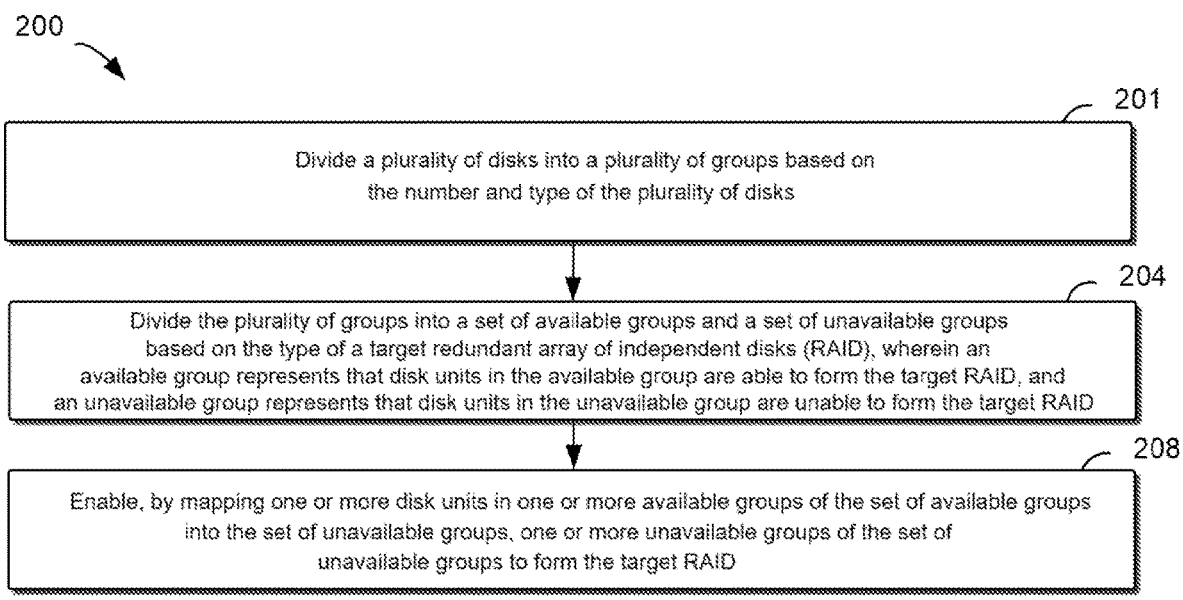
FIG. 2 illustrates a flow chart of a method for disk mapping of a storage system according to the embodiments of the present disclosure.

The schematic diagram of an architecture of a storage system in which a method and/or a process according to the embodiments of the present disclosure can be implemented is described above in conjunction with FIG. 1. A flow chart of a method 200 for disk mapping of a storage system according to an embodiment of the present disclosure will be described below with reference to FIG. 2. As described above for the storage system, the method 200 for disk mapping according to the embodiment of the present disclosure may be executed at an edge device with computing power or at a cloud server, and the present disclosure is not limited in this regard. In order to more effectively utilize a non-effective capacity disk space, the method 200 for disk mapping according to the embodiment of the present disclosure is proposed.

At block 201, a plurality of disks are divided into a plurality of groups based on the number and type of the plurality of disks. According to the embodiment of the present disclosure, in order to obtain the corresponding plurality of groups, the storage system may first divide, based on capacities of the plurality of disks in the storage system, the plurality of disks into a first number of disks of a first type with a first capacity, a second number of disks of a second type with a second capacity, and a third number of disks of a third type with a third capacity.

For example, in the storage system, there may be n types of disks, and the size/capacity of each type of disks in these disks may respectively be S1, S2, S3 . . . Sn (S1>S2>S3 . . . >Sn). In some embodiments, the number of each type of disks in these disks may respectively be N1, N2, N3 . . . Nn. As an example, the storage system may have a first type of disks with a capacity of S1, of which the number is N1, a second type of disks with a capacity of S2, of which the number is N2, a third type of disks with a capacity of S3, of which the number is N3, and an nth type of disks with a capacity of Sn, of which the number is Nn, where $S_i$ represents a capacity/size of one type of disks, and $N_i$ represents the number of one type of disks.

The storage system may then set up groups based on these n types of disks. For example, the first group may be set to consist of disk units DU with a capacity of S1-S2, the number of the disk units being N1. In the embodiment of the present disclosure, the disk unit DU is a data structure representing a portion of a physical disk. Similarly, the second group may be set to consist of disk units DU with a capacity of S2-S3, the number of the disk units being N1+N2. Similarly, the nth group may be set to consist of disk units DU with a capacity of Sn, the number of the disk units being N1+N2+ . . . +Nn. In other words, the group may be a set of disk units DU.

In this way, different levels of disk units may be located through different groups. By this way, n groups Group1, Group2, Group3 . . . Groupn may be obtained in n different types of disks. Additionally or alternatively, in some embodiments, each group may also have an attribute or a data structure shown in Table 1 below.

TABLE 1

Attributes of a group
Group

| ID: xxxxxxxx |
| DU: [ . . . ] |
| Length: X |
| Capacity: X Gb | where ID represents an identifier or an identification number of the group, DU represents a disk unit object, length represents the number of disk units contained in the group, and capacity represents a logical disk capacity of one disk unit.

Additionally or alternatively, in some embodiments, a disk unit DU representing a disk in a partition may also have an attribute or a data structure shown in Table 2 below.

TABLE 2

Attributes of a disk unit
Disk unit

| ID: xxxxxx |
| Physical_disk: Dn |
| Group_ID: Gn | where ID represents an identifier or an identification number of the disk unit object, Physical_disk represents a disk identifier of a physical disk where the disk unit object is located, and Group_ID represents a group identifier of a group where the disk unit object is located. According to some embodiments of the present disclosure, (a plurality of) DUs in a group always have the same capacity and come from different physical disks.

It should be understood that when the storage system has only one type of disks to create a pool, there may be no non-consumable capacity. In the context of the present disclosure, systems with different types of disks are considered. It should also be understood that in a storage system composed of different types of disks, the non-consumable portion is always located in a large disk. This is because that the redundant part is not enough to create a small RAID and cannot provide protection for user data.

At block 204, the plurality of groups are divided into a set of available groups and a set of unavailable groups based on the type of a target redundant array of independent disks (RAID), wherein an available group represents that disk units in the available group are able to form the target RAID, and an unavailable group represents that disk units in the unavailable group are unable to form the target RAID. According to the embodiment of the present disclosure, the storage system may first determine the type of the target RAID to be formed. The minimum numbers of disks required to form different types of target RAIDs are different. If a user creates a pool/storage system of a specified RAID type with a RAID width (for example, the number of disks that may be read or written simultaneously) of X, a minimum predetermined number of disks $R_{min}$ may be obtained, which may be represented by the following formula:

$$R_{min} = X + a (a \text{ is number of spare disks}) \quad (1)$$

where $R_{min}$ is the minimum number of disks required to form/build a target RAID when the type of the target RAID is specified, where a is the number of spare disks.

According to the embodiment of the present disclosure, as an example, the storage system may then respectively compare a length of each group from the previous plurality of groups (the number of disk units included in each group) with the minimum predetermined number of disks in $R_{min}$, and make determination, which may be represented by the following formula:

$$\text{Group.length} < R_{min} \quad (2)$$

where Group.length represents a length of one group among the plurality of groups, that is, the number of disk units included in the group.

According to the embodiment of the present disclosure, as an example, if the number of disk units in a group is greater than or equal to the minimum predetermined number of disks $R_{min}$, it indicates that the disk units in the group may independently form a target RAID, and the group may be further identified as an available group. In some embodiments, a plurality of available groups may form a set of available groups, and the set of available groups may also be represented as an effective capacity list ecap_list=[$G_1$ $G_2$, $G_3$, . . . ]. Here, $G_1$, $G_2$, $G_3$, . . . may separately represent a first available group, a second available group, a third available group, and so on.

According to the embodiment of the present disclosure, as an example, if the number of disk units in a group is less than the minimum predetermined number of disks $R_{min}$, it indicates that the disk units in the group cannot independently form a target RAID, and the group may be further identified as an unavailable group. In some embodiments, a plurality of unavailable groups may form a set of unavailable groups, and the set of unavailable groups may also be represented as a non-effective capacity list non_ecap_list=[$G_1$, $G_2$, $G_3$ . . . ]. Here, $G_1$, $G_2$, $G_3$ . . . may separately represent a first unavailable group, a second unavailable group, a third unavailable group, and so on.

At block 208, one or more unavailable groups of the set of unavailable groups are enabled to form a target RAID by mapping one or more disk units in one or more available groups of the set of available groups into the set of unavailable groups. According to the embodiment of the present disclosure, as an example, an unavailable group from the set of unavailable groups may be represented as "Gi."

According to the embodiment of the present disclosure, as an example, in order to map an available group "Ga" from the set of available groups to an unavailable group "Gi" so that a capacity of the unavailable group "Gi" may be used to form a target RAID, the storage system needs to meet the following conditions during mapping: 1. The capacity of the DU in the available group Ga needs to be greater than or equal to the capacity of the DU in the unavailable group Gi; 2. Physical disks of moving DUs cannot be the same, as disks of the RAID should come from different physical disks; 3.

The length of the available group Ga after movement should be greater than or equal to $R_{min}$ According to some embodiments of the present disclosure, for the condition 1, if the capacity $G_a$·capacity of the DU in the available group Ga is equal to the capacity $G_a$·capacity of the DU in the unavailable group Gi (that is, $G_a$·capacity=$G_i$·capacity), the storage system may check whether other conditions (such as the condition 2 and the condition 3) are met. According to some embodiments of the present disclosure, for the condition 1, if the capacity $G_a$·capacity of the DU in the available group Ga is greater than the capacity $G_a$·capacity of the DU in the unavailable group Gi (that is, $G_a$·capacity) >$G_i$·capacity, the available group Ga may be further split, so that the capacity of the DU in the available group G after split is the same as the capacity of the DU in the unavailable group Gi.

According to some embodiments of the present disclosure, for the condition 2, when choosing to map (a plurality of) DUs from the available group Ga to the unavailable group Gi, it is necessary to ensure that the physical disks of the DUs to be mapped are different from the physical disks of the unavailable group Gi, so that the DUs that form a RAID come from different physical disks, thereby achieving redundant backup.

According to some embodiments of the present disclosure, for the condition 3, if $G_a$·length−$R_{min}$≥$R_{min}$−$G_i$·length the selected ($R_{min}$−$G_i$·length) DUs of the available group Ga may be moved to the unavailable group Gi. On the contrary, if $G_a$·length−$R_{min}$≥$R_{min}$−$G_i$·length is not established, it indicates that there is no group with enough available DUs, and there are still non-consumable DUs after mapping, so DU mapping will not occur.

Additionally or alternatively, in some embodiments, before (a plurality of) disk units DU are mapped from the available group Ga to the unavailable group Gi, a total available capacity C of a plurality of groups including the available group Ga and the unavailable group Gi is calculated, which may be represented by the following formula:

$$C = \sum_k G_k.\text{capacity} \times (G_k.\text{length} - a) \times \frac{D\_D}{X} (G_k.\text{length} \geq R_{min}) \quad (3)$$

where $G_k$ represents a group with a length greater than $R_{min}$, α is the number of spare disks, D_D is the number of data drives in the RAID, and X is a width of the RAID.

In some embodiments, it is also possible to calculate a total available capacity $C_{new}$ of a plurality of new groups after the mapping is expected to be completed, which may be represented by the following formula:

$$C_{new} = \sum_k G'_k.\text{capacity} \times (G'_k.\text{length} - a) \times \frac{D\_D}{X} (G'_k.\text{length} \geq R_{min}) \quad (4)$$

where $G'_k$ represents one of all of the plurality of new groups.

If $C_{new}$ is greater than C, it indicates that there are more capacities available in the current storage system. Therefore, the disks may be mapped/reorganized into a new group to obtain more available space. Additionally or alternatively, in some embodiments of the present disclosure, (the plurality of) disk units DU can be mapped by changing the group identifiers of the disk units DU.

Figure 3:
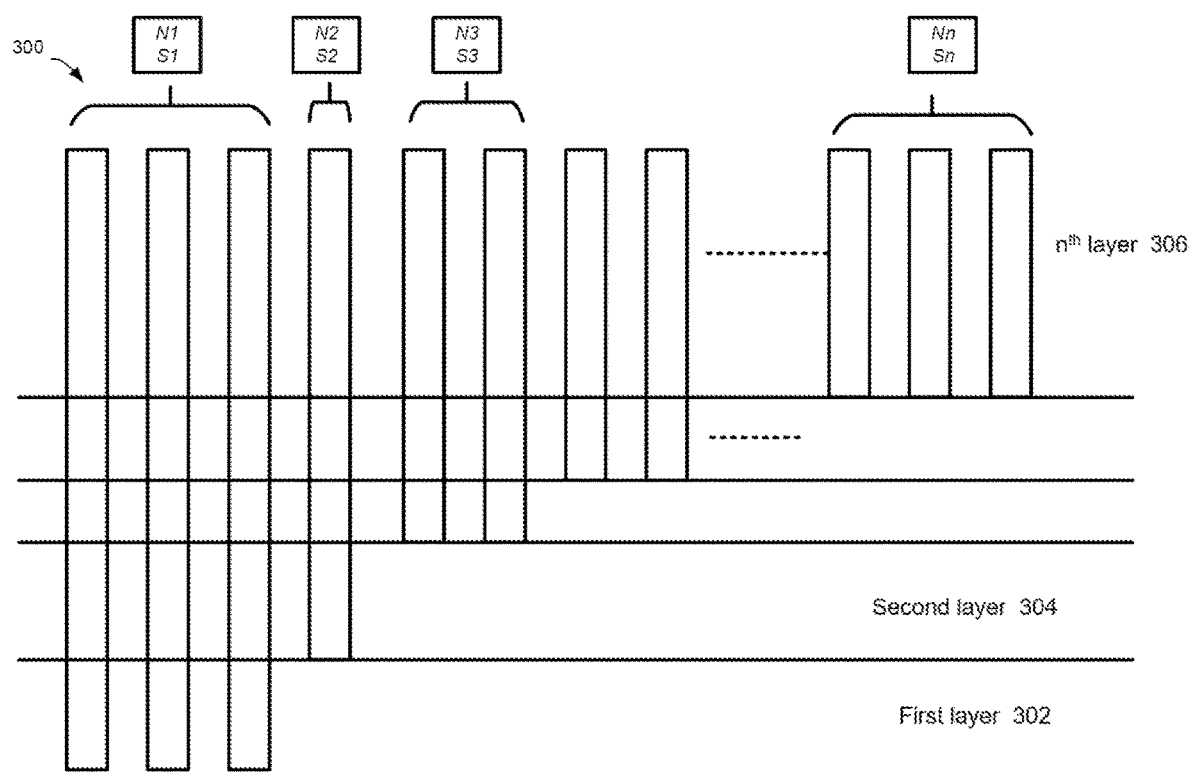
FIG. 3 illustrates a schematic diagram of a storage system for grouping disks of various different types of capacities according to some embodiments of the present disclosure.

FIG. 3 illustrates a schematic diagram of a storage system 300 for grouping disks of various different types of capacities according to some embodiments of the present disclosure. As shown in FIG. 3, there may be n types of disks with different capacities in the storage system 300. As an example, there are N1 disks with a capacity of S1, N2 disks with a capacity of S2, N3 disks with a capacity of S3, . . . , and Nn disks with a capacity of Sn in the storage system 300.

Correspondingly, these disks may be divided into a plurality of portions. Based on the n types of disks, these disks may be divided into n hierarchical portions, such as a first layer 302, a second layer 304, . . . , and an $n^{th}$ layer 306. These hierarchical portions may also be referred to as "groups" and have disk units with different numbers and capacities. As an example, the first layer/first group 302 may be formed by N1 disk units with a capacity of S1-S2, the second layer/second group 304 may be formed by N1+N2 disk units with a capacity of S2-S3, . . . , and the $n^{th}$ layer/$n^{th}$ group 306 may be formed by N1+N2+ . . . +Nn disk units with a capacity of Sn. Therefore, by using the method according to the present disclosure, various types of disks with different capacities may be divided into different groups.

Figure 4A:
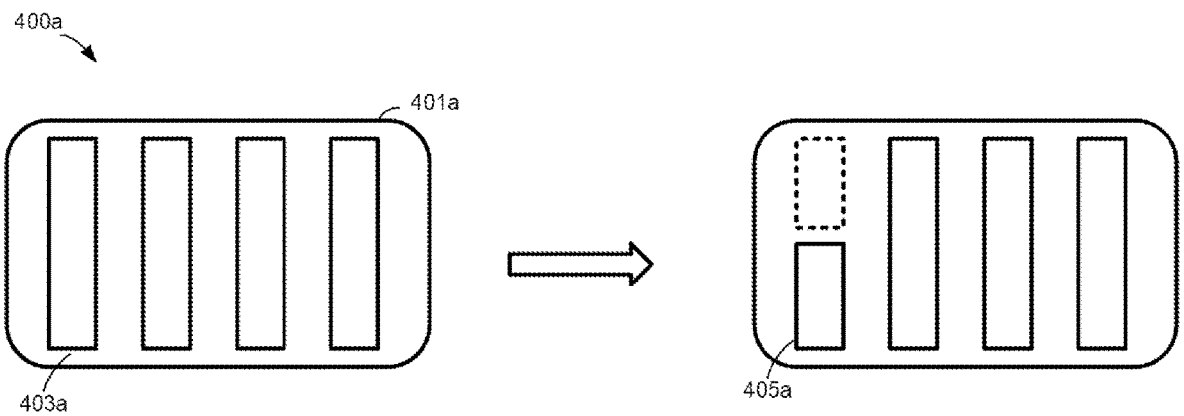
FIG. 4a illustrates a schematic diagram for splitting some groups among a plurality of groups associated with some embodiments of the present disclosure.

FIG. 4a illustrates a schematic diagram for splitting 400a some groups among a plurality of groups according to some embodiments of the present disclosure. As shown in FIG. 4a, in some embodiments, disk units in one or more available groups of a set of available groups may be split, so that the capacities of the split disk units are the same as the capacities of the disk units in an unavailable group, thereby achieving mapping of the disk units. As an example, there may be a group 401a and some disk units DU, such as 403a. Some capacities of the disk units DU may be reduced, so that the reduced portion may be used by a destination group (an unavailable group). The reduced value is equal to the capacities of the disk units DU in the destination group, so that the capacities of the DU in the destination group may remain the same. If only the capacity of the disk unit DU 403a in the group 401a is reduced, it may result in disk units DU with different capacities in a source group (an available group), such as 405a.

Figure 4B:
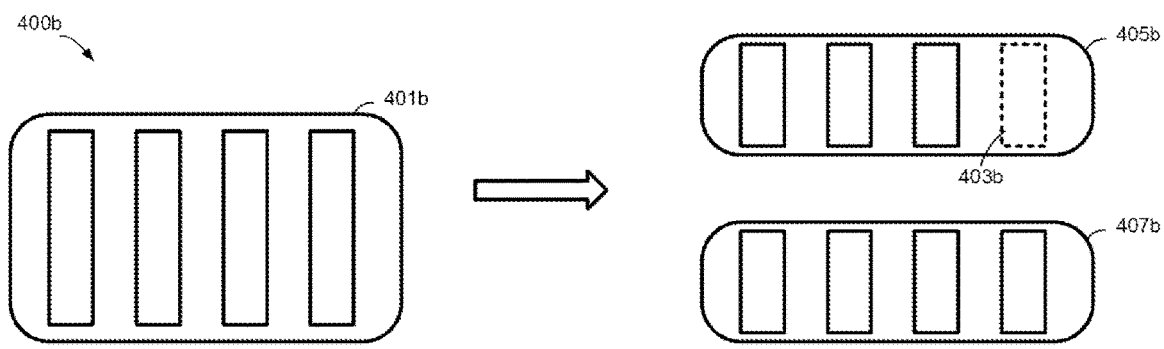
FIG. 4b illustrates a schematic diagram for splitting some groups among a plurality of groups according to some embodiments of the present disclosure.

In order to maintain capacities of disk units in the group to be the same, a method for splitting some groups according to some embodiments of the present disclosure is provided. FIG. 4b illustrates a schematic diagram for splitting 400b some groups among a plurality of groups according to some embodiments of the present disclosure.

As shown in FIG. 4b, a source group (an available group) 401b may be split into a group $G_a$ 405b with the same disk unit capacity as a destination group (an unavailable group) and another group $G'_a$ 407b. Disk units in the group $G_a$ 405b, such as a disk unit 403b, may then be moved/mapped to the destination group. The capacities of disk units in another group $G'_a$ 407b are equal to the difference in disk unit capacity between the source group and the destination group. The another group $G'_a$ 407b may continue to be used to form a target RAID, because the number of disk units therein is greater than or equal to $R_{min}$. In this way, more efficient utilization of the entire disk space can be achieved.

Figure 5:
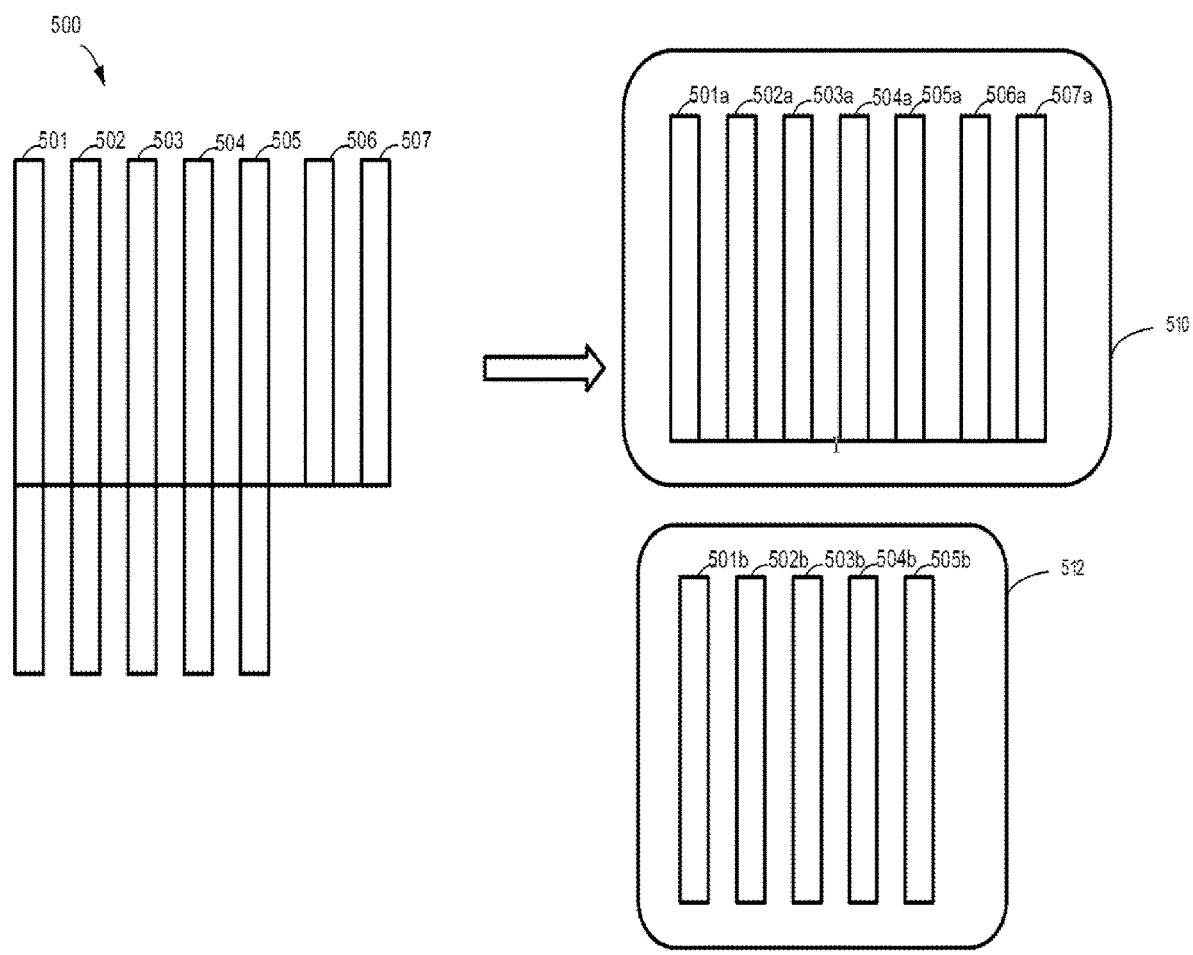
FIG. 5 illustrates a schematic diagram for mapping some groups among a plurality of groups according to some embodiments of the present disclosure.

FIG. 5 illustrates a schematic diagram for mapping some groups among a plurality of groups according to some embodiments of the present disclosure. As an example, one or more disk units in available groups from different physical disks may be mapped to one or more unavailable groups, thus enabling the one or more unavailable groups to have the disk units required to form a RAID and ultimately achieving effective utilization of the disk space. As shown in FIG. 5, as an example, a storage system 500 may include a plurality of physical disks 501, 502, 503, 504, 505, 506, and 507, and these physical disks may be further divided into two groups 510 and 512. The group 510 may include disk units 501a, 502a, 503a, 504a, 505a, 506a, and 507a, and the group 512 may include disk units 501b, 502b, 503b, 504b, 505b, 506b, and 507b.

The disk units 501a, 502a, 503a, 504a, and 505a respectively correspond to 501b, 502b, 503b, 504b, and 505b, and respectively come from the same physical disk. If a RAID with a RAID type of RAID 5(4+1) is to be formed, the disk units 506a and 507a in the group 510 can be mapped into the group 512, but the disk units 501a, 502a, 503a, 504a, and 505a cannot be mapped into the group 512, because it is necessary to ensure that each disk unit in the RAID group comes from a different physical disk according to the embodiments of the present disclosure.

Figure 6:
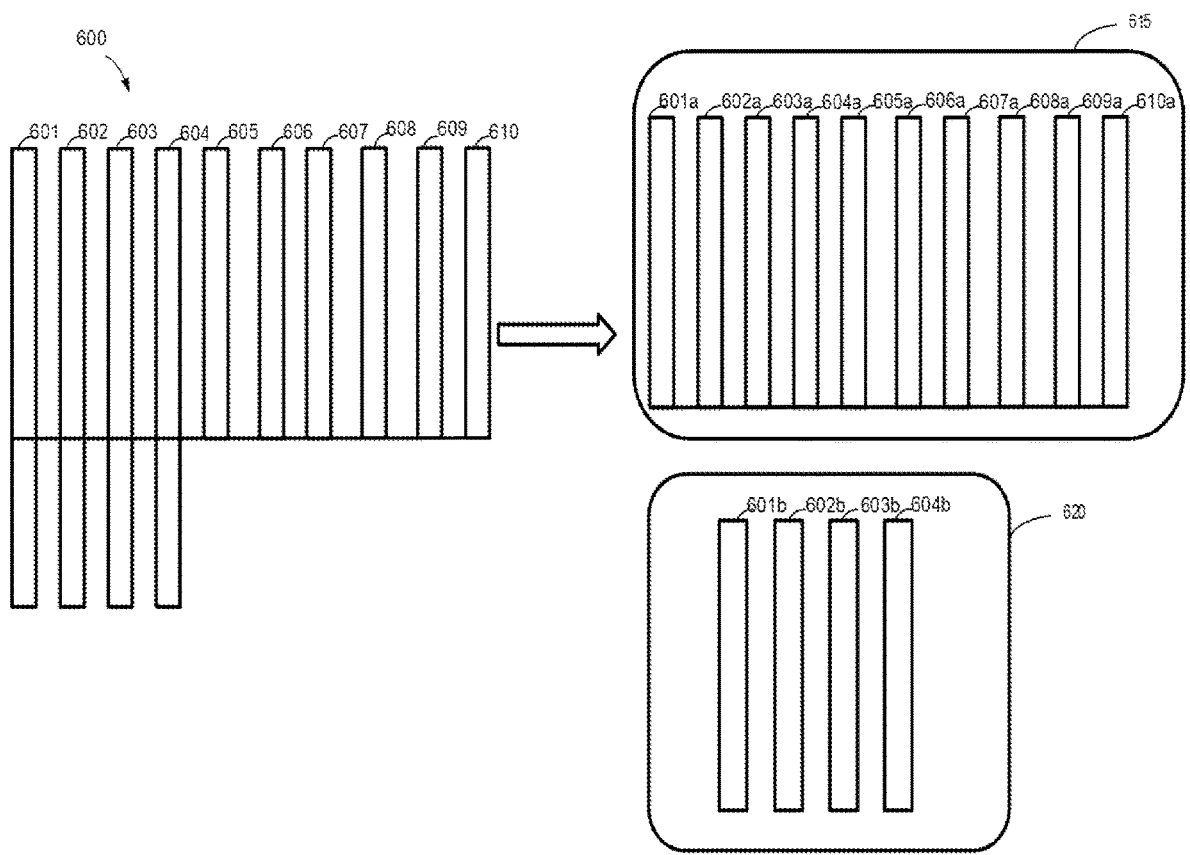
FIG. 6 illustrates a schematic diagram for mapping some groups among a plurality of groups according to some embodiments of the present disclosure.

FIG. 6 illustrates a schematic diagram for mapping some groups among a plurality of groups according to some embodiments of the present disclosure. As shown in FIG. 6, as an example, a storage system 600 may include a plurality of physical disks 601, 602, 603, 604, 605, 606, 607, 608, 609, and 610 with a total of 10 disks. The capacity of the physical disks 601, 602, 603, and 604 may be 700 GB, and the capacity of the physical disks 605, 606, 607, 608, 609, and 610 may be 350 GB. The plurality of physical disks 601 to 610 may be further initialized into two groups G1 615 and G2 620.

The group G1 615 may have an ID of G1, and may include group units 601a, 602a, 603a, 604a, 605a, 606a, 607a, 608a, 609a, and 610a. The length of the group G1 615 is 10, and its capacity is 350 GB. As an example, the group unit 601a may have an ID of DU 1, a physical disk of D1, and a Group_ID of G1, the group unit 602a may have an ID of DU 2, a physical disk of D2, and a Group_ID of G1, . . . , and the group unit 610a may have an ID of DU 10, a physical disk of D10, and a Group_ID of G1. Similarly, the group G2 620 may have an ID of G2 and may include group units 601b, 602b, 603b, and 604b. The group G2 620 has a length of 4 and a capacity of 350 GB. As an example, the group unit 601b may have an ID of DU 11, a physical disk of D1, and a Group_ID of G2, . . . , and the group unit 604b may have an ID of DU 14, a physical disk of D4, and a Group_ID of G2.

To create a pool of RAID 5 (4+1), corresponding mapping operations may be performed. A total consumable space before mapping is $$C = 350 \times (10 - 1) \times \frac{4}{5} = 2520(GB),$$

and $R_{min}$=4+1+1=6. Due to the length of the group G1 615 being 10 and greater than $R_{min}$, the group G1 615 may be classified into a set of available groups, that is, ecap_list= [$G_1$]. Due to the length of the group G2 620 being 4 and less than $R_{min}$, the group G2 620 may be classified into a set of unavailable groups, that is, non_ecap_list=[$G_2$].

The following conditions for the group G1 615 and the group G2 620 may be found through detection: Firstly, according to the embodiment of the present disclosure, capacities of disk units in one or more available groups to be mapped need to be greater than or equal to capacities of disk units in an unavailable group. In this example, the capacity of the available group is the same as the capacities of two unavailable groups, that is, $G_1$·capacity=$G_2$·capacity. Secondly, physical disks where the disk units in the one or more available groups to be mapped are located are all different from physical disks where the disk units in the available group are located. All selected disk units to be mapped may come from the disk units 605a, 606a, 607a, 608a, 609a, and 610a of the physical disks 605 to 610, which are different from the physical disks 601 to 605 where the unavailable group is located. In addition, the number of the disks in the one or more available groups to be mapped is greater than or equal to the minimum predetermined number of disks after mapping. As an example, in the present disclosure, the capacities of the two groups satisfy $G_1$·length−$R_{min}$=4, $R_{min}$−$G_2$·length=2 $G_1$·length−$R_{min}$>$R_{min}$−$G_2$·length, so two disk units may be randomly selected from the disk units 605a to 610a to be mapped from the group G1 to the group G2. As an example, in the embodiment of the present disclosure, the two disk units to be mapped may be the disk units 609a and 610a.

Additionally or alternatively, the one or more available groups of the set of available groups may be mapped to the set of unavailable groups based on determining that the sum of capacities of the mapped plurality of groups is greater than the capacities of the plurality of groups before mapping.

The attribute of a mapped group may also be changed accordingly. For example, the attribute of the mapped group G1 615 may be that the group G1 615 has an ID of G1, includes group units 601*a*, 602*a*, 603*a*, 604*a*, 605*a*, 606*a*, 607*a*, and 608*a*, and has a length of 8 and a capacity of 350 GB. The attribute of the mapped group G2 615 may be that the group G2 620 has an ID of G2, includes group units 609*a*, 610*a*, 601*b*, 602*b*, 603*b*, and 604*b*, and has a length of 6 and a capacity of 350 GB. A total consumable capacity after mapping may be recalculated using the following formula:

$$C_{new} = \sum_k G'_k.\text{capacity} \times (G'_k.\text{length} - a) \times \frac{D_D}{X} (G'_k.\text{length} \geq R_{min}) \quad (5)$$

$$= 350 \times (8-1) \times \frac{4}{5} + 350 \times (6-1) \times \frac{4}{5} = 3360(GB)$$

It can be obtained by the above formula that compared with the available capacity before mapping, more available capacities may be obtained after mapping, such as 840 (3360-2520) GB. By using the above mapping method, physical disks can be reassembled and utilized more efficiently, thereby improving the utilization rate of disk resources and ultimately minimizing or eliminating unavailable space in the physical disks.

Figure 7:
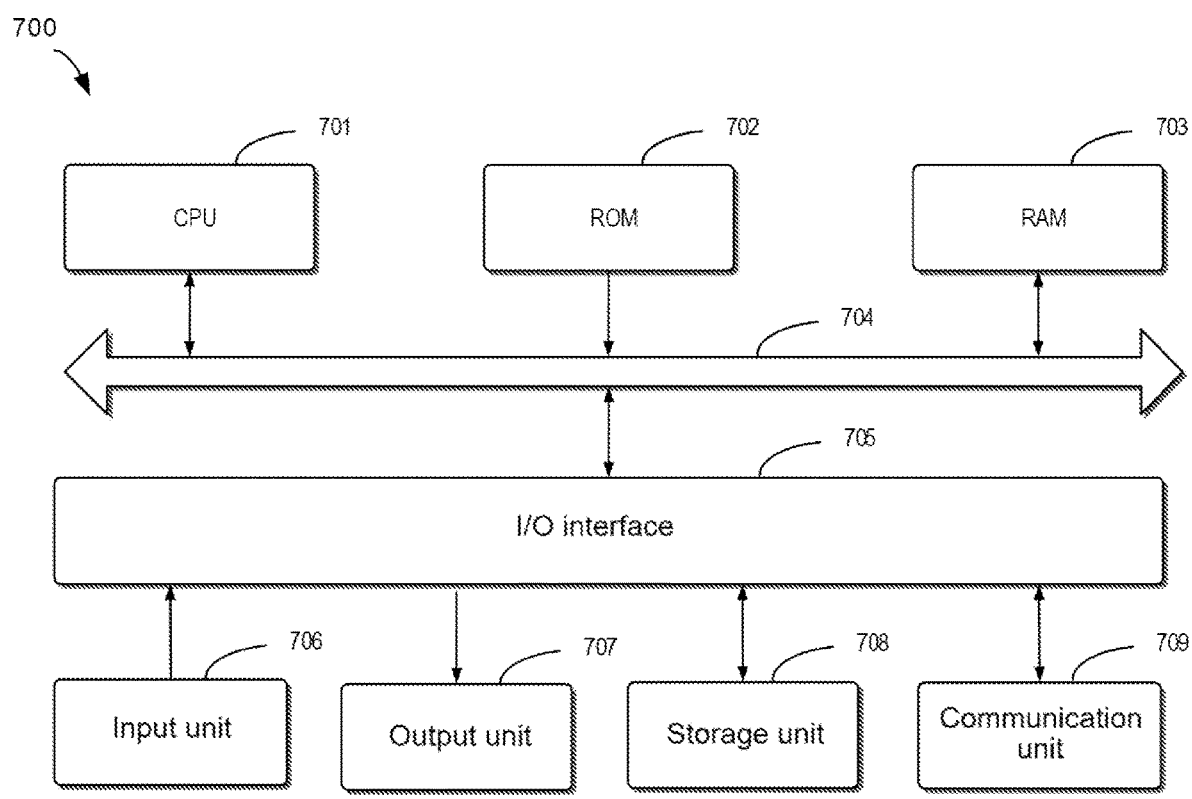
FIG. 7 illustrates a schematic block diagram of an example device which may be configured to implement the embodiments of the present disclosure.

FIG. 7 illustrates a schematic block diagram of an example device 700 which may be configured to implement the embodiments of the present disclosure. The computing device in FIG. 1 may be implemented using the device 700. As shown in the figure, the device 700 includes a central processing unit (CPU) 701 that may execute various appropriate actions and processing according to computer program instructions stored in a read-only memory (ROM) 702 or computer program instructions loaded from a storage unit 708 to a random access memory (RAM) 703. Various programs and data required for the operation of the device 700 may also be stored in the RAM 703. The CPU 701, the ROM 702, and the RAM 703 are connected to each other through a bus 404. An Input/Output (I/O) interface 705 is also connected to the bus 704.

A plurality of components in the device 700 are connected to the I/O interface 705, including: an input unit 706, such as a keyboard and a mouse; an output unit 707, such as various types of displays and speakers; a storage page 708, such as a magnetic disk and an optical disc; and a communication unit 709, such as a network card, a modem, and a wireless communication transceiver. The communication unit 709 allows the device 700 to exchange information/data with other devices via a computer network, such as the Internet, and/or various telecommunication networks.

The various processes and processing described above, such as the method 200, may be performed by the processing unit 701. For example, in some embodiments, the method 200 may be implemented as a computer software program that is tangibly included in a machine-readable medium, such as the storage unit 708. In some embodiments, part or all of the computer program may be loaded and/or installed onto the device 700 via the ROM 702 and/or the communication unit 709. When the computer program is loaded into the RAM 703 and executed by the CPU 701, one or more actions of the method 200 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or technical improvements to technologies on the market, or to enable other persons of ordinary skill in the art to understand the embodiments disclosed here.

The invention claimed is:

1. A method for disk mapping, the method comprising:
dividing a plurality of disks into a plurality of groups, the groups within the plurality of groups being different based on the number and type of disks in the groups;
dividing the plurality of groups into a set of available groups and a set of unavailable groups based on the type of a target redundant array of independent disks (RAID), wherein an available group represents that disk units in the available group are able to form the target RAID, and an unavailable group represents that disk units in the unavailable group are unable to form the target RAID; and
enabling, by mapping one or more disk units in one or more available groups of the set of available groups into the set of unavailable groups, one or more unavailable groups of the set of unavailable groups to form the target RAID;
wherein mapping the one or more available groups of the set of available groups into the set of unavailable groups further comprises:
comparing the sum of capacities of the mapped plurality of groups with the sum of capacities of the plurality of groups before mapping; and
mapping, based on determining that the sum of capacities of the mapped plurality of groups being greater than the capacities of the plurality of groups before mapping, the one or more available groups of the set of available groups into the set of unavailable groups.

2. The method according to claim 1, wherein mapping the one or more disk units in the one or more available groups of the set of available groups into the set of unavailable groups meets the following conditions:
capacities of the disk units in the one or more available groups to be mapped being greater than or equal to capacities of the disk units in the unavailable groups;
a physical disk where the disk units in the one or more available groups to be mapped are located being different from a physical disk where the disk units in the available groups are located; or
the number of disks in the one or more available groups to be mapped being, after mapping, greater than or equal to a minimum predetermined number of disks, wherein the minimum predetermined number of disks is the number required to form the target RAID.

3. The method according to claim 1, wherein dividing the plurality of disks into the plurality of groups comprises:
dividing, based on capacities of the plurality of disks, the plurality of disks into a first number of disks of a first type with a first capacity, a second number of disks of a second type with a second capacity, and a third number of disks of a third type with a third capacity;
setting the number of disk units in a first group as the first number, and setting the capacity of each disk unit in the first group as the first capacity minus the second capacity; and
setting the number of disk units in a second group as the first number plus the second number, and setting the capacity of each disk unit in the second group as the second capacity minus the third capacity.

4. The method according to claim 2, wherein dividing the plurality of groups into a set of available groups and a set of unavailable groups based on the type of the target RAID further comprises:
identifying, based on the number of disk units in one group of the plurality of groups being greater than or equal to the minimum predetermined number of disks, the one group of the plurality of groups as an available group; and
identifying, based on the number of disk units in one group of the plurality of groups being less than the minimum predetermined number of disks, the one group of the plurality of groups as an unavailable group.

5. The method according to claim 2, further comprising:
splitting, based on the capacity of the disk unit in the available group to be mapped being greater than the capacity of the disk unit in the unavailable group, the capacity of the disk unit in the available group to be mapped to be the same as that of the disk unit in the unavailable group.

6. The method according to claim 2, further comprising:
continuing to detect other conditions among the conditions based on the capacity of the disk unit in the available group to be mapped being equal to the capacity of the disk unit in the unavailable group.

7. The method according to claim 1, wherein dividing the plurality of disks into the plurality of groups includes:
forming a first group of disks having a first number of disks and a second group of disks having a second number of disks from the plurality of disks, the first number of disks being different from the second number of disks.

8. The method according to claim 7, wherein forming the first group of disks having the first number of disks and the second group of disks having the second number of disks from the plurality of disks includes:
from the plurality of disks, placing disks having a first storage capacity in the first group of disks and placing disks having a second storage capacity in the second group of disks to form the first and second groups, the first storage capacity being different from the second storage capacity.

9. The method according to claim 1, wherein the disk units in each of the plurality of groups have the same capacity and come from different physical disks.

10. The method according to claim 1, wherein the disk unit has a physical disk identifier and a group identifier, and the disk unit is mapped based on the physical disk identifier and the group identifier.

11. An electronic device, comprising:
a processor; and
a memory, the memory being coupled to the processor and storing instructions, wherein the instructions, when executed by the processor, cause the device to perform the following actions:
dividing a plurality of disks into a plurality of groups, the groups within the plurality of groups being different based on the number and type of disks in the groups;
dividing the plurality of groups into a set of available groups and a set of unavailable groups based on the type of a target redundant array of independent disks (RAID), wherein an available group represents that disk units in the available group are able to form the target RAID, and an unavailable group represents that disk units in the unavailable group are unable to form the target RAID; and
enabling, by mapping one or more disk units in one or more available groups of the set of available groups into the set of unavailable groups, one or more unavailable groups of the set of unavailable groups to form the target RAID;
wherein mapping the one or more available groups of the set of available groups into the set of unavailable groups further comprises:
comparing the sum of capacities of the mapped plurality of groups with the sum of capacities of the plurality of groups before mapping; and
mapping, based on the sum of capacities of the mapped plurality of groups being greater than the capacities of the plurality of groups before mapping, the one or more available groups of the set of available groups into the set of unavailable groups.

12. The electronic device according to claim 11, wherein mapping the one or more disk units in the one or more available groups of the set of available groups into the set of unavailable groups meets the following conditions:
capacities of the disk units in the one or more available groups to be mapped being greater than or equal to capacities of the disk units in the unavailable groups;
a physical disk where the disk units in the one or more available groups to be mapped are located being different from a physical disk where the disk units in the available groups are located; and
the number of disks in the one or more available groups to be mapped being, after mapping, greater than or equal to a minimum predetermined number of disks, wherein the minimum predetermined number of disks is the number required to form the target RAID.

13. The electronic device according to claim 11, wherein dividing the plurality of disks into the plurality of groups comprises:
dividing, based on capacities of the plurality of disks, the plurality of disks into a first number of disks of a first type with a first capacity, a second number of disks of a second type with a second capacity, and a third number of disks of a third type with a third capacity;
setting the number of disk units in a first group as the first number, and setting the capacity of each disk unit in the first group as the first capacity minus the second capacity; and
setting the number of disk units in a second group as the first number plus the second number, and setting the capacity of each disk unit in the second group as the second capacity minus the third capacity.

14. The electronic device according to claim 12, wherein dividing the plurality of groups into a set of available groups and a set of unavailable groups based on the type of the target RAID further comprises:
identifying, based on the number of disk units in one group of the plurality of groups being greater than or equal to the minimum predetermined number of disks, the one group of the plurality of groups as an available group; and
identifying, based on the number of disk units in one group of the plurality of groups being less than the minimum predetermined number of disks, the one group of the plurality of groups as an unavailable group.

15. The electronic device according to claim 12, further comprising:
  splitting, based on the capacity of the disk unit in the available group to be mapped being greater than the capacity of the disk unit in the unavailable group, the capacity of the disk unit in the available group to be mapped to be the same as that of the disk unit in the unavailable group.

16. The electronic device according to claim 12, further comprising:
  continuing to detect other conditions among the conditions based on the capacity of the disk unit in the available group to be mapped being equal to the capacity of the disk unit in the unavailable group.

17. The electronic device according to claim 11, wherein the disk units in each of the plurality of groups have the same capacity and come from different physical disks.

18. The electronic device according to claim 11, wherein the disk unit has a physical disk identifier and a group identifier, and the disk unit is mapped based on the physical disk identifier and the group identifier.

19. A computer program product, the computer program product being tangibly stored on a non-transitory computer-readable storage medium and comprising computer-executable instructions, wherein the computer-executable instructions, when executed, cause a computer to perform the following operations:
  dividing a plurality of disks into a plurality of groups, the groups within the plurality of groups being different based on the number and type of disks in the groups;
  dividing the plurality of groups into a set of available groups and a set of unavailable groups based on the type of a target redundant array of independent disks (RAID), wherein an available group represents that disk units in the available group are able to form the target RAID, and an unavailable group represents that disk units in the unavailable group are unable to form the target RAID; and
  enabling, by mapping one or more disk units in one or more available groups of the set of available groups into the set of unavailable groups, one or more unavailable groups of the set of unavailable groups to form the target RAID;
  wherein mapping the one or more available groups of the set of available groups into the set of unavailable groups further comprises:
  comparing the sum of capacities of the mapped plurality of groups with the sum of capacities of the plurality of groups before mapping; and
  mapping, based on determining that the sum of capacities of the mapped plurality of groups being greater than the capacities of the plurality of groups before mapping, the one or more available groups of the set of available groups into the set of unavailable groups.

20. The computer program product according to claim 19, wherein mapping the one or more disk units in the one or more available groups of the set of available groups into the set of unavailable groups meets the following conditions:
  capacities of the disk units in the one or more available groups to be mapped being greater than or equal to capacities of the disk units in the unavailable groups;
  a physical disk where the disk units in the one or more available groups to be mapped are located being different from a physical disk where the disk units in the available groups are located; and
  the number of disks in the one or more available groups to be mapped being, after mapping, greater than or equal to a minimum predetermined number of disks, wherein the minimum predetermined number of disks is the number required to form the target RAID.

* * * * *